United States Patent [19]

Minowa

[11] Patent Number: 4,912,485
[45] Date of Patent: Mar. 27, 1990

[54] PRINT CONTROLLING APPARATUS FOR A THERMAL PRINTER

[75] Inventor: Masahiro Minowa, Suwa, Japan

[73] Assignee: Seiko Epson Corporation, Tokyo, Japan

[21] Appl. No.: 390,437

[22] Filed: Aug. 3, 1989

Related U.S. Application Data

[63] Continuation of Ser. No. 149,457, Jan. 28, 1988, abandoned.

[30] Foreign Application Priority Data

Jan. 28, 1987 [JP] Japan .................................. 62-17553
Feb. 19, 1987 [JP] Japan .................................. 62-36609

[51] Int. Cl.$^4$ .......................... G01D 15/10; B41J 3/20
[52] U.S. Cl. ................................ 346/76 PH; 346/1.1; 400/120
[58] Field of Search ..................... 346/1.1, 76; 400/120

[56] References Cited

U.S. PATENT DOCUMENTS 4,464,669  8/1984  Sekiya et al. .................... 346/76 PH
4,574,293  3/1986  Inui et al. ....................... 346/76 PH
4,675,695  6/1987  Samuel ........................ 346/76 PH X
4,723,132  2/1988  Matsuo ........................ 346/76 PH X Primary Examiner—George H. Miller, Jr.
Attorney, Agent, or Firm—Blum Kaplan

[57] ABSTRACT

A print controlling apparatus for a thermal printer which is adapted to print with a thermal head having a plurality of heat generating elements on thermal paper or on non-thermal paper or thermal ink ribbon, is provided. The print controlling apparatus includes a processor for processing data to be printed and then outputting the data. A head control circuit devices coupled between the processor and thermal head for converting the data to be printed output from the processor to energizing signals for selectively heating the heat generating elements. The heat control circuit device includes a timing mechanism for providing at least two predetermined energizing intervals. A storage mechanism stores the present print data and at least one previous print data. A gating circuit coupled to the timing mechanism and storage mechanism produces energizing signals for each of the heat generating elements by logically combining the predetermined energizing intervals and present print data and previous print data.

24 Claims, 8 Drawing Sheets

FIG. 8
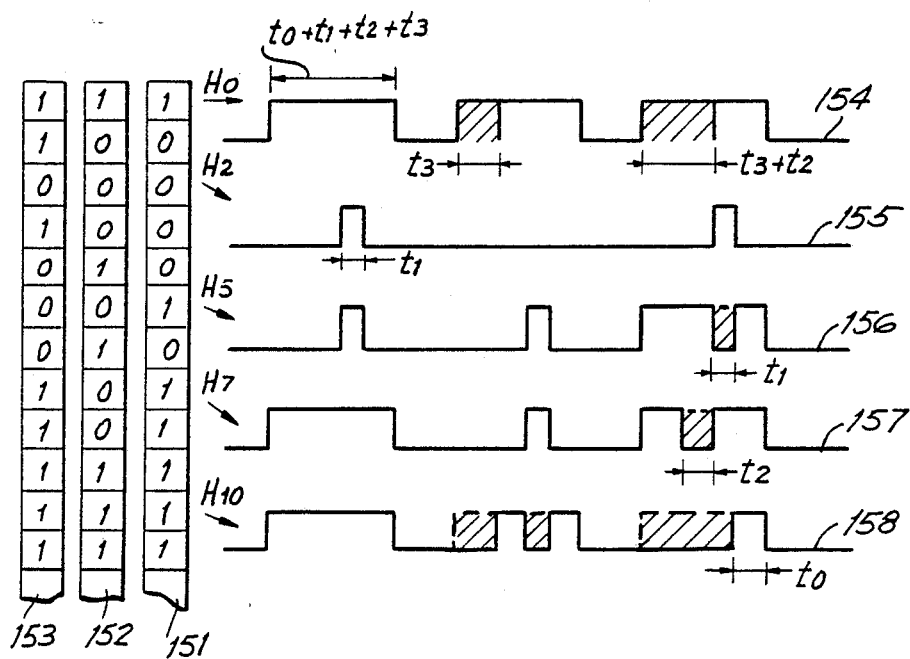
FIG. 10A
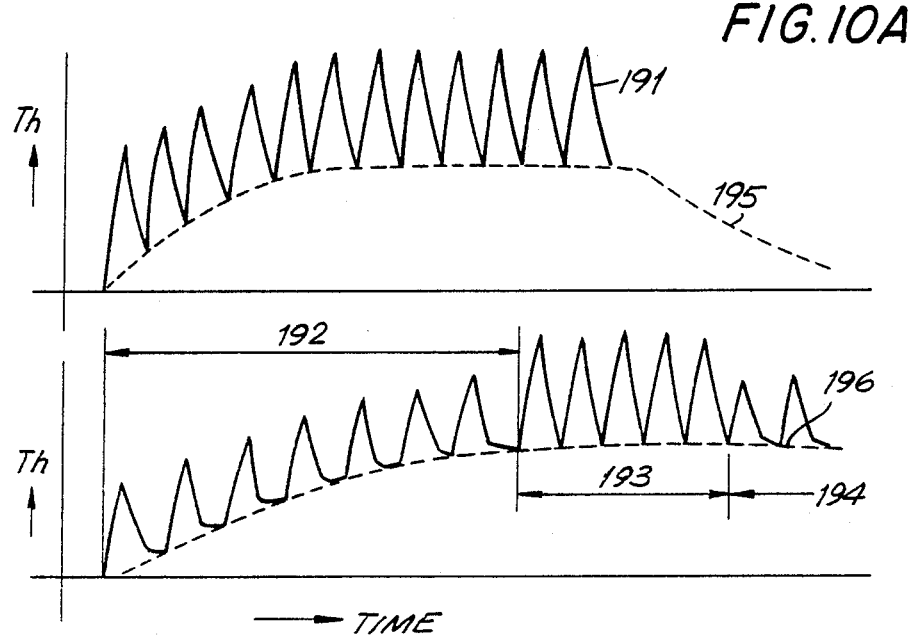
FIG. 10B

FIG. 9A
FIG. 9B
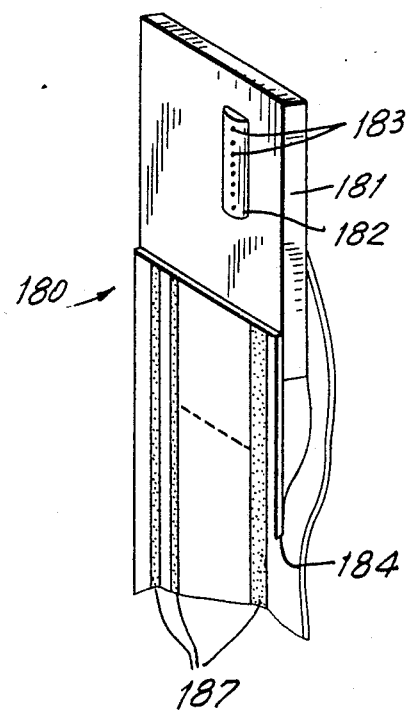
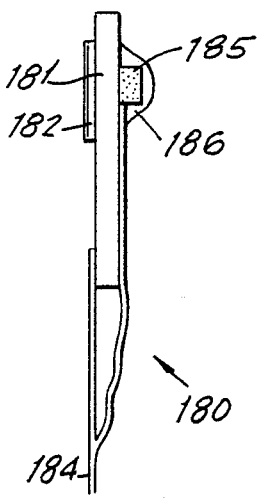

PRINT CONTROLLING APPARATUS FOR A THERMAL PRINTER

This is a continuation of application Ser. No. 07/149,457, filed on Jan. 28, 1988 now abandoned.

BACKGROUND OF THE INVENTION

The invention is generally directed to a driving apparatus and driving method for controlling heat generating elements on a thermal print head.

Various methods have been previously utilized to prevent deterioration of the print quality due to the accumulation of heat in a thermal head caused when the thermal head is continuously used for a period of time without any stops. Japanese Patent Publication No. 48631/80 discloses a method of determining the energizing time by storing the preceding data for each dot (i.e., that is the data that was printed at the previous printing location of the dot). Japanese Patent Publication No. 18507/82 discloses a method of changing the energizing time for the print head with a driving frequency. These methods are generally called "history controlling methods" because they operate based on the prior printing history of the print head.

A conventional method of printing forwards data to a drive IC of a thermal head after it has been processed by a central processor unit (CPU). However, when a thermal printer is operated at high speed, the CPU cannot process the information quickly enough and does not maintain the speed of operation required. Therefore, this method which utilizes the processing powers of the CPU encounters problems in high-speed thermal printer operations.

In addition, Japanese Patent Laid-Open No. 158476/86 discloses a preheat controlling method wherein the thermal head is preheated immediately before the driving data when the next driving data requires the printing of a dot and combines a driving signal reduction due to the past driving histories of the print head. However, this preheating method has a problem, that is, the dot density is reduced after a blank has been printed.

Accordingly, there i a need for a print controlling apparatus and printing method for producing high speed printing on a serial type thermal printer and maintaining constant dot density regardless of the prior printing history of the thermal head.

SUMMARY OF THE INVENTION

A print controlling apparatus for a thermal printer which is adapted to print with a thermal head having a plurality of heat generating elements on thermal paper or on non-thermal paper or thermal ink ribbon, is provided. The print controlling apparatus includes a processor for processing data to be printed and then outputting the data. A head control circuit device is coupled between the processor and thermal head for converting the data to be printed which is output from the processor to energizing signals for selectively heating the heat generating elements. The head control circuit device includes a timing mechanism for providing at least two predetermined energizing intervals. A storage mechanism stores the present print data and at least one previous print data. A gating circuit coupled to the timing mechanism and storage mechanism produces energizing signals for each of the heat generating elements by logically combining the predetermined energizing intervals and present print data and previous print data.

Accordingly, it is an object of the invention to provide an improved print controlling apparatus for a thermal printer.

Another object of the invention is to provide a print controlling apparatus for a thermal printer particularly suited to high speed printing.

A further object of the invention is to provide an improved print controlling apparatus for a thermal printer which preheats the thermal head so as to maintain constant printing density.

Still another object of the invention is to provide an improved print controlling apparatus of a thermal printer which obviates the need to process the data history in the CPU, thereby allowing the CPU to operate at high speed and thereby increase the printing speed of the thermal printer.

Still another object of the invention is to provide an improved heat generating control circuit unit formed as an integrated chip for direct memory access from the CPU at high speed so as to increase the printing speed of the thermal printer.

A further object of the invention is to provide improved preheating pulse application to the heat generating element in response to the data history so that uniform density printing is achieved without decreasing the printing density.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings in which:

FIG. 8 is a partially diagrammatic partially graphical comparison showing the process of applying energy to the thermal head in connection with the print controlling apparatus constructed in accordance with the invention;

FIG. 9A and 9B are partially cut-away prospective and sectional views of a thermal head respectively, constructed in accordance with the invention;

FIG. 10A and 10B are graphical representations of the relationship between the print head temperature and time in accordance with a conventional preheating method and a preheating method in accordance with the present invention;

DETAILED DESCRIPTION OF THE PREFERRED EMBODIMENTS

Figure 1:
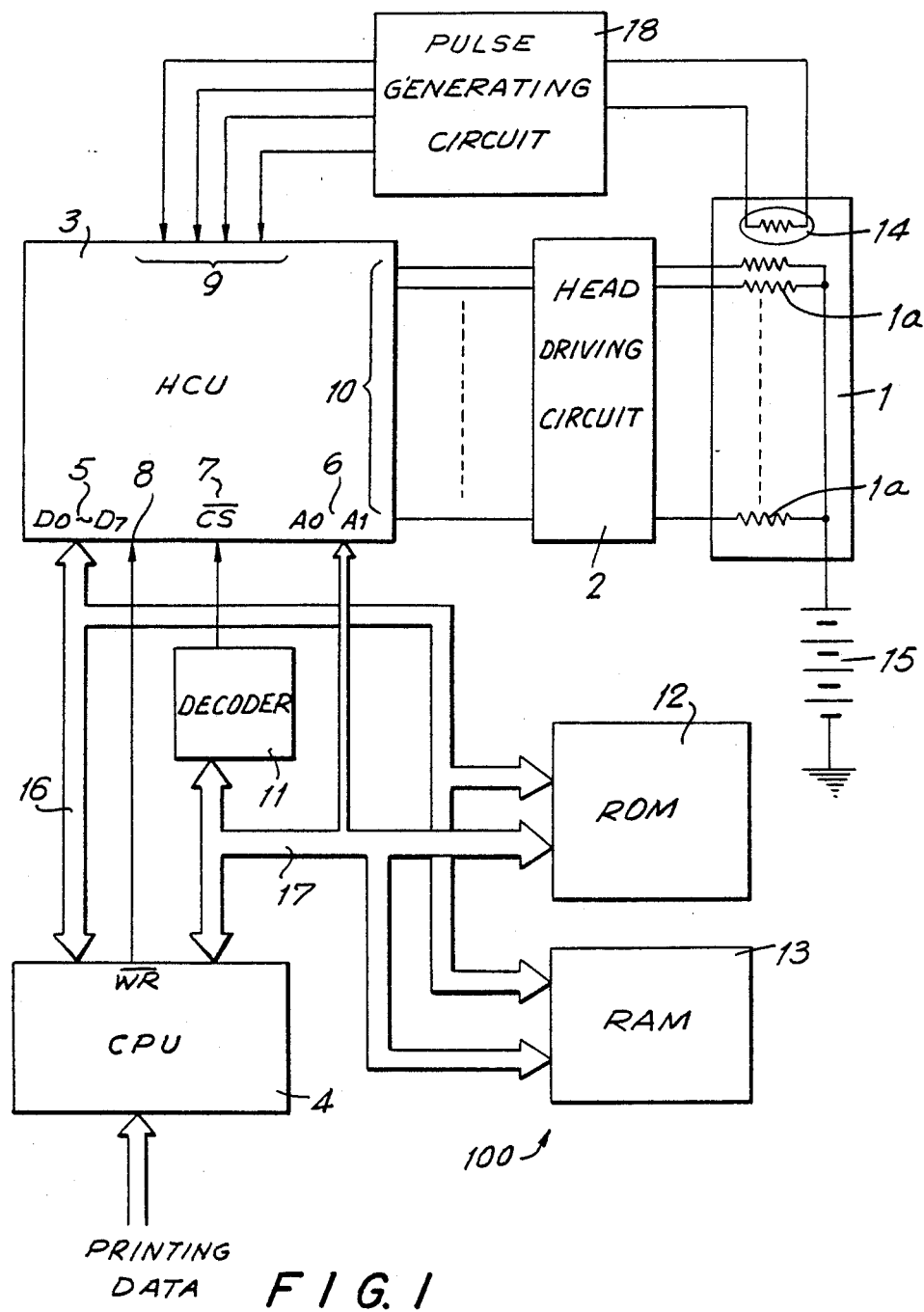
FIG. 1 is a functional block diagram of a thermal printer including a print controlling apparatus constructed in accordance with the present invention.

Reference is first made to FIG. 1 wherein a print controlling apparatus, generally indicated as 100 constructed in accordance with a first embodiment of the invention is depicted. Thermal head 1 has a plurality of heat generating elements 1a. A head driving circuit 2 drives thermal head 1. A head controlling circuit unit (HCU) 3, which in preferred embodiment is integrated as a single chip, is disposed adjacent to the central processor unit (CPU) 4, which acts as a processing unit and controls the amount of heat generated in thermal head 1. A pulse generating circuit 18 supplies pulses of at least two pulse widths to HCU 3 and includes a thermistor 14 for detecting the temperature of thermal head 1 and an ambient temperature thereof.

In a preferred embodiment, CPU 4 is for example an eight bit CPU coupled to a data bus 16, an address bus 17 and generating a $\overline{WR}$ signal, a kind of data strobe signal. Other signals are generated and CPU 4 is coupled to conventional components not relevant herein and, commonly present which are not shown.

Head controlling circuit unit 3 is a preferred embodiment is constructed by gate array technology and is formed as a single chip in the same way that CPU 4 is formed as a single chip. HCU 3 has a built-in data latch circuit groups 31, 32, 33 which act as a temporary memory circuit as well as a plurality of data input terminals 5 connected to data bus 16, a plurality of address input terminals 6 for receiving 2 bits from address bus 17 and a chip selecting terminal ($\overline{CS}$ terminal) 7. Chip selecting terminal 7 acknowledges a designation of a unit in accordance with predetermined address information transmitted from CPU 4. A data latch timing input terminal 8 is connected to the $\overline{WR}$ signal of CPU 4. A plurality of pulse input terminals 9 are present for receiving output from the pulse generating circuit and for determining the energizing time of the heat generating elements. A head driving output terminal 10 outputs driving signals to each of the heat generating elements of thermal head 1 through head driving circuit 2. Each output terminal corresponds to a heat generating element on the thermal head which prints a dot, these elements are all referred to herein as $H_n$ where n varies from zero to twenty three in the embodiment shown including a 24 dot head.

A decoder 11 produces a predetermined address code for HCU 3. A ROM 12 stores the print control program, a character generator and the like. Further, a RAM 13 and a power source 15 are included. Power source 15 is shown coupled to thermal head 1, but each of the other components is also connected to a power supply in a conventional manner.

Figure 2:
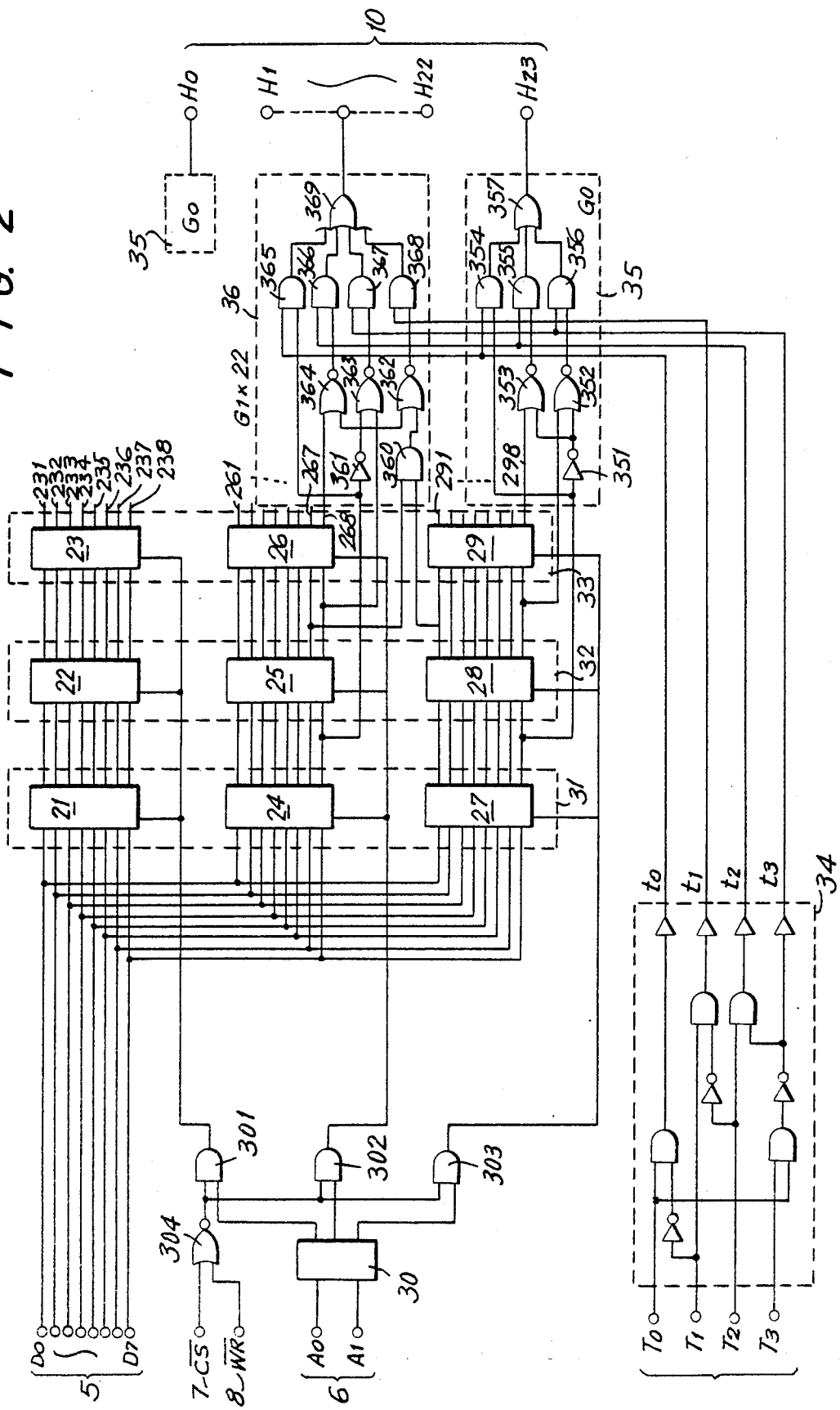
FIG. 2 is a partial block diagram of a head control circuit unit constructed in accordance with a first embodiment of the invention.

Reference is next made to FIG. 2 wherein a circuit diagram of a first embodiment of HCU 3 is depicted, like reference numerals representing like elements. Data input terminals 5 are connected t data latch circuit group 31 which includes data latch circuits 21, 24 and 27. In addition, data latch groups 32 and 33 includes data latch circuits 22, 25, 28 and 23, 26, 29, respectively. Data latch circuit groups 31, 32 and 33 include the present printing data for a column (corresponding to the thermal head), the immediately previous printing data and the twice previous printing data, respectively.

In serial thermal printers the thermal print head includes printing or heating elements 1a for printing a column of dots at each printing position. In the embodiment discussed herein, the thermal head includes 24 dots which are driven by 24 output terminals $H_0$ to $H_{23}$. The thermal head print a column of dots at a printing position, is then moved to the next printing position where the next column of dots is printed. This repeats until the nd of a line when the paper is advanced and the printing process continues. For purposes of explanation, the data for the column printing of data to be printed next will be identified as the current printing data. The data used to print the column immediately prior to the present printing position is refereed to as the immediately. previous printing data. Earlier printing data will be referred to as second previous printing data third previous printing data and so forth.

Data latch circuits 21, 22 and 23 which are connected in series maintain the data for output terminals $H_0$ to $H_7$ of the head driving signal. Data latch circuits 24, 25 and 26 maintain the data for dot position $H_8$ to $H_{15}$. Finally, latch circuits 27, 28 and 29 maintain the data corresponding to dots $H_{16}$ to $H_{23}$.

Data latch circuit group 31, which includes data latch circuits 21, 24 and 27, maintains one full dot column of present head data, i.e. for dots $H_0$ to $H_{23}$. Likewise, data latch circuit group 32 includes a full column of immediately previous print data while data latch circuit group 33 maintains a full column of second previous print data.

Address decoder 30 distributes the eight bits which come in on data lines D0-D7 to the appropriate data latch circuit (i.e. one of data latch circuits 21, 24 and 27) in accordance with the address information of the outputted data from CPU 4. Address decoder 30 based on inputs $A_0$ and $A_1$, and timed by the $\overline{CS}$ and $\overline{WR}$ signal from the CPU through AND gates 301, 302, 303 and NOR gate 304. Thus, a full column of data must be sent in three batches to data input terminal 5 because the data bus is only eight bits wide and the thermal head has 24 dots. Thus, in one approach the CPU would first send the data for dots $H_0$–$H_7$ then send the data for dots $H_8$–$H_{15}$ and finally the data for dots $H_{16}$–$H_{23}$.

An energizing interval signal generating circuit, generally indicated by dotted line 34 converts pulses input from energizing pulse input terminals T0–T3 into an energizing interval signal. As seen in FIG. 1, these signals are input from pulse generating circuit 18. Pulse generating circuit 18 may be configured so as to output energizing interval signals rather than pulses so as to obviate the need for a separate energizing interval signal generating circuit. Circuit 34 output energizing interval signals t0-t3.

While the head driving data is output to the data bus from CPU 4, the $\overline{WR}$ signal is output and the $\overline{CS}$ terminal acts in response to address information which is prestored on the memory map. The data is then transmitted to each of data latch circuits 21, 24 and 27 respectively in accordance with the lowest two bits information of the address bus. In addition, as new data is latched into one of data latch circuits 21, 24 and 27, the data previously stored in that data latch circuit advances one data latch circuit to the right. Thus, if data is read into data latch circuit 21, the previous data stored in latch circuit 21 shifts to data latch circuit 22 while the data previously stored in he data latch circuit 22 shifts to data latch circuit 23. In this way, the present print data is always stored in data latch circuit 21, the immediately previous print data is stored in data latch circuit 22 and the second previous print data is stored in data latch circuit 23. The shifting of data is synchronously controlled by the output of AND gate 301. Utilizing the two lowest bits from the address bus up to four different groups of data latch circuits can be directly accessed. As the number of generating elements on the thermal print head increases, it may be necessary to increase the number of address bits utilized to select an appropriate data latch circuit for storage of the present data.

The heat controlling circuit unit includes its own transfer controlling mechanism synchronous with the data latch timing. Thus, HCU 3 makes it possible to increase the speed of data processing as compared with conventional methods such as are disclosed in U.S. Pat. No. 4,673,952 wherein the latch timing is further transmitted from a processing unit after transferring head driving data.

When the predetermined pulses $T_o$, $T_1$, $T_2$, $T_3$ are input into energizing pulse input terminal 9 after the data is set in the data latch circuits, the appropriate head generating elements are energized for the appropriate time. Two types of gate circuits are connected between data latch circuits 21–29 and output terminals $H_0$–$H_{23}$. One is a gate $G_0$ identified by dotted line box 35 while the second is a gate circuit $G_1$ shown in dotted box 36. Gate circuits $G_0$ are utilized for end dot output terminals $H_0$ and $H_{23}$ while gate circuits $G_1$ are used for the middle twenty two output terminals $H_1$–$H_{22}$. A different gate circuit is used to create the driving signal for the two outer dots because of the physical differences with respect to heat resulting from the absence of an adjacent dot on one side.

FIG. 2 merely shows one example of a gate circuit $G_0$ and one example of gate circuit $G_1$. In practice, there are 22 gate circuits of the $G_1$ type and 2 gate circuits of the $G_0$ type, i.e. one gate circuit for each heating element or dot on the thermal head. The gate circuits $G_0$ and $G_1$ are coupled to output lines 231–238, 261–268 and 291–298 on data latch circuits 23, 26 and 29 and outputs from the other data latch circuits.

Gate circuit 36 includes an AND gate 360, inverter 361, NOR gates 362, 363, 364, AND gates 365, 366, 367, 368 and OR gate 369. The particular gate circuit 36 shown in FIG. 2 is for output $H_{15}$. The present print data corresponding to dot $H_{15}$ is input to inverter 361 and one of the inputs of AND gate 365. The inverted present dot $H_{15}$ print data is then input to one input of each of NOR gates 362, 363, 664. The immediately previous print data for dot $H_{15}$ is the other input to NOR gate 363. The immediately previous data for the surrounding dots, i.e., dots $H_{14}$ and $H_{16}$ are input to AND gate 360 and the output of gate 360 is tee other input to NOR gate 362. Finally, the second previous print data for dot $H_{15}$ output on output line 268 is the other input to NOR gate 364. The outputs of NOR gates 364, 363, 362 are one of the inputs to AND gates 366, 367, 368, respectively. Energizing interval signals t0–t3 are one of the inputs to AND gates 665, 368, 366, 367 respectively. The outputs of each of these four AND gates form the input to OR gate 369. The output of OR gate 369 is the output driving signal $H_{15}$. As noted above, each of output signals $H_1$–$H_{22}$ is formed by a similar circuit 36.

Circuit 35, which is used to produce end dot output signals $H_0$ and $H_{23}$, is different from circuit 36. A circuit 35 includes an inverter 351, OR gates 352, 353, AND gates 354, 355, 356 and OR gate 357. Gate circuit 35 shown in FIG. 2 is connected to produce output signal $H_{23}$. The present printing data for dot $H_{23}$ is one direct input to AND gate 554 and to inverter 351. The inverter output of inverter 351 is then input as one input OR gates 352, 353. The immediately previous printing data for dot $H_{23}$ is input as the other input to NOR gate 302. The second previous print data for dot 23 is output on output line 298 to the other input of OR gate 353. The output of OR gates 353 and 352 are inputs to AND gates 355, 356. Energizing interval signals T0, T2, T3 are inputs to AND gates 354, 355, 356, respectively. The output of AND gates 354, 355, 356 are the inputs to OR gate 357. The output of OR gate 357 is output driving signal $H_{23}$. The reason for the particular arrangement of circuits 35 and 36 will be described below.

Figure 3:
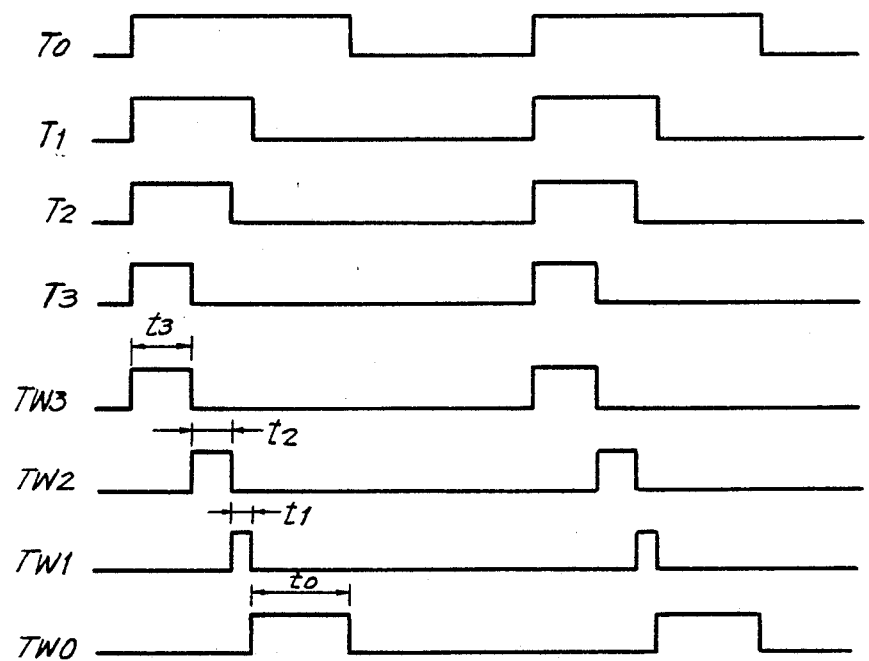
FIG. 3 is a graphical view showing the relationship between the energizing pulse input signals and the energizing interval signals in the head control circuit unit in accordance with the invention.
Figure 4:
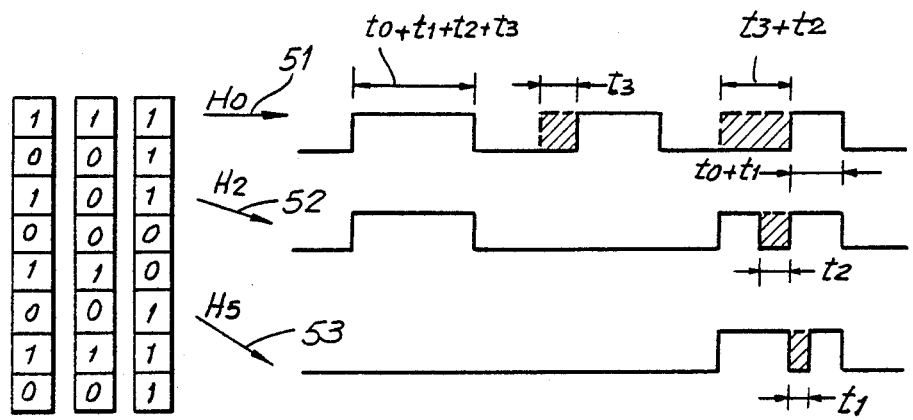
FIG. 4 is a partially diagrammatic and partially graphical view showing the process of applying energy to the thermal head in accordance with the print controlling apparatus constructed in accordance with the invention.

Reference is next made to FIG. 3 wherein the relationship between the signals input to energizing pulse input terminal 9 T0, T1, T2, T3 to energizing interval signals TW0, TW1 TW2, TW3. T0–T3 are the input wave forms received at energizing pulse input terminal 9. TW0–TW3 are the energizing interval signals output from circuit 34 and t0–t3 are the pulse widths of the respected energizing signals. t0 is the primary energizing interval when the present dot print data indicates that a dot should be printed Intervals t1, t2 and t3 are auxiliary intervals when the determination f these intervals is based upon the past driving results. Further, t3 is an interval (predetermined energizing interval) wherein the total energizing period is reduced when a dot has been energized with the immediately previous timing. T2 is the interval which is reduced when a dot has been energized at the immediately twice previous timing. Printing with constant dot density can be achieved in accordance with the accumulation of past energizing amounts, by varying these intervals as shown in FIGS. 3 and 4. T3 is the interval closer to the present time and t2 and interval t3 is longer (wider) than interval t2.

Reference is next made to FIG. 4 wherein an explanation of the method for energizing the thermal head of the print control unit is depicted. Blocks 41, 42 and 43 correspond to the data stored in latch circuits 21, 22 and 23, respectively. That is, the data in block 41 is the present print data for dots $H_0$–$H_7$, block 42 includes the immediately previous print data and block 43 includes the second previous print data. The head driving signal output waveforms 51, 52 and 53 are the output waveforms for the $H_0$ output terminal, the $H_2$ output terminal and the $H_5$ output terminal, respectively. Block 43 in addition to being the second previous print data is also the initial printing data. That is, there is not print data previous to data 43. Output wave forms 51, 52, 53 show the output wave forms for the three dot positions represented by blocks 43, 42 and 41, respectively. As shown in the first pulse in output wave form 51, in the initial energizing position when a dot is to be printed the whole energizing interval (t0+t1+t2+t3) is append when a dot is to be printed, i.e., energized. When immediately previous printing data also printed a dot, the energizing interval is reduced by period t3. The second pulse of output wave form 51 shows this situation corresponding to the printing f the data in block 42.

As seen, a dot was printed in data of block 43 for $H_0$ and thus the shaded portion corresponding to time period t3 is eliminated from the energizing interval. As a result, the total energizing interval is equal to time periods t0+t1+t2. When a dot has been printed in the second previous print data and the dot is selected to be printed by the present print data as well, time period t2 is removed from the energizing interval. This arrangement is shown as the third pulse (the second pulse is a non-pulse) of waveform 52 where time period t2 shown in hatched lines, is removed from the energizing interval so that the heating element is driven for a time equals to t0+t1+t3. The third pulse of waveform 51 shows a situation in which a dot was printed at the immediately previous print position and at the second previous print position. As a result, intervals t3 and t2 are removed from the energizing interval, leaving the energizing interval composed only of time periods t0+t1. Finally, when the dots on both sides of the selected dot are printed at the immediately previous printing position, which results in some heating of the heating element therebetween time period t1 is removed from the driving interval. Thus, the driving interval shown as the third pulse of output waveform 53 includes time periods t0+t2+t3. As each of the different conditions operate independently of the other, and there are three separate conditions under which the energizing interval is reduced, there are eight different combinations of the four energizing signal intervals (t0, t1, t2, t3) when a dot is to be printed. Depending upon the prior history, energizing interval from only t0 up to t0+t1+t2+t3 may be applied to a heating element. Circuits 35 and 36 shown in FIG. 2 create the logic to produce the results consistent with the prior data history and with respect to time periods t0, t1, t2 and t3. The gate circuits 35 for the end dot outputs $H_0$ and $H_{23}$ are different because they do not have two adjacent dots positions.

Where 50 mA or less current is required to drive the heat generating elements of the thermal head, the entire head driving circuit can be formed in the same package, such as an integrated circuit utilizing a gate array. Similarly the driving circuit can be formed as a single chip in an integrated circuit by using standard circuit cells.

Figure 5:
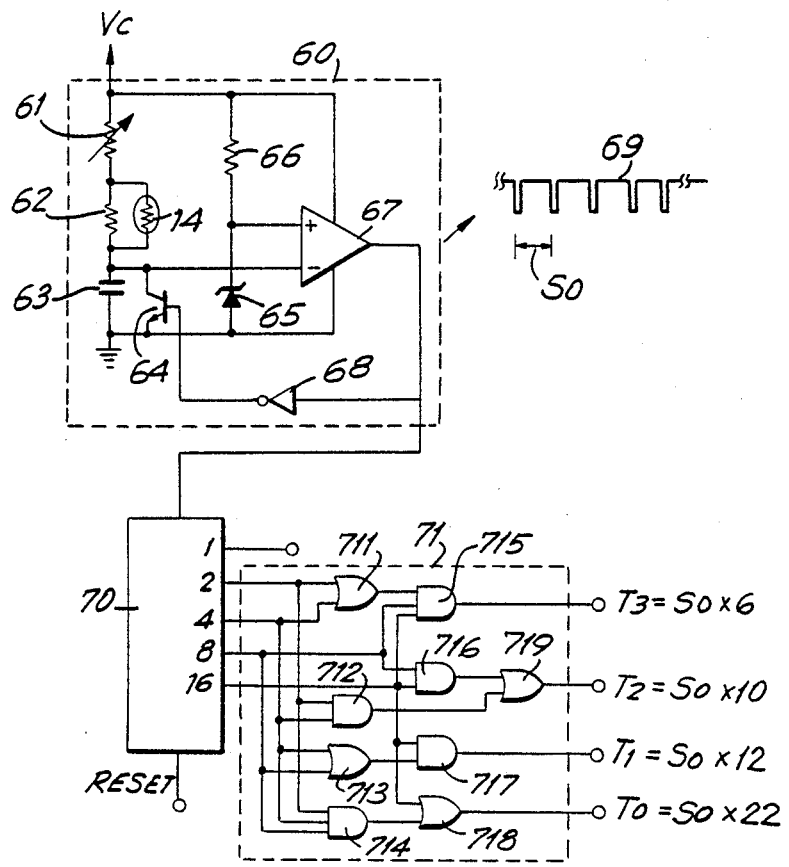
FIG. 5 is a partial circuit diagram of a pulse generating circuit in accordance with a first embodiment of the invention.

Reference is next made to FIG. 5 wherein a pulse generating circuit constructed in accordance with a first embodiment of the invention is depicted schematically. The pulse generating circuit includes a standard oscillator circuit 60 coupled to a power source $V_C$, a binary counter circuit 70 and a gate circuit 71. Oscillator circuit 60 includes variable resistor 61, resistor 62, thermistor 14, capacitor 63, transistor 64, Zenerdiode 65, resistor 66, voltage comparator 67 and invertor 68. One terminal of variable resistor 61 is coupled to voltage supply $V_C$. The other terminal of variable resistor 61 is coupled to one terminal of resistor 62 and thermistor 14. The other terminals of resistor 62 and thermistor 14 are coupled to the inverting input of comparator 67, the collector terminal of transistor 64 and one terminal of capacitor 63. The other terminal of capacitor 63 i coupled to ground as is the emitter terminal of transistor 64.

Transistor 666 and Zener diode 65 are coupled in series between voltage $V_C$ and ground with the junction between resistor 66 and Zener diode 65 being coupled to the non-inverting input of comparator 67. Comparator 67 has voltage and ground inputs as well. The output of comparator 67, which is shown as waveform 69 is input to invertor 68 which then inputs the inverted signal to the base electrode of transistor 64. The output wave form 69, having a period $S_0$, is input to binary counter circuit 70. Gate circuit 71 is coupled to various of the outputs of counter circuit 70. Gate circuit 71 outputs pulses t0, t1, t2 and t3. Gate circuit 71 includes OR gate 711, AND gate 712, OR gate 713, AND gates 714, 715, 716, 717 and OR gates 718, 719. These logic gates are set up so as to produce four pulses representative of multiples of input pulse interval $S_0$. $T3 = S_0 \times 6$; $T2 = S_0 \times 10$; $T1 = S_0 \times 12$; and $T0 = S_0 \times 22$.

The energizing time of the thermal head is controlled by the above described pulse generating circuit, thereby making it possible to always apply the most suitable energy to the thermal head. Further, the applied energy which is in accordance with the data history is always correlated to the total energizing time, thereby providing for excellent and consistent printing quality. Thereby, the total pulse interval changes in accordance with the detected temperatures of the head in the line, and the pulse widths of energizing interval signals TW0 to TW3 and of t0 to t3 are changed in accordance therewith (or proportion thereto).

Further, it is possible to integrally form counter circuit 70 and gate circuit 71 with a gate array within pulse generating circuit 60 and to thereby provide a simple assembly including a programmable timer.

In the above embodiment, the memory circuit includes the data latch circuits. However, when the memory data is significantly greater, in addition to the data control member a special RAM may be utilized. In such a case, immediately after recording the next data in the data control member, the special RAM is accessed to move the immediately previous data into the twice previous data memory area and move the present memory data into the immediately previous print data memory area, synchronous with the signal indicative of the energizing interval. Selected data is moved into active registers and then a predetermined gate circuit depending upon the memory data selected for the data applied to it which results in the heat generation control data being supplied to the print head.

Figure 6:
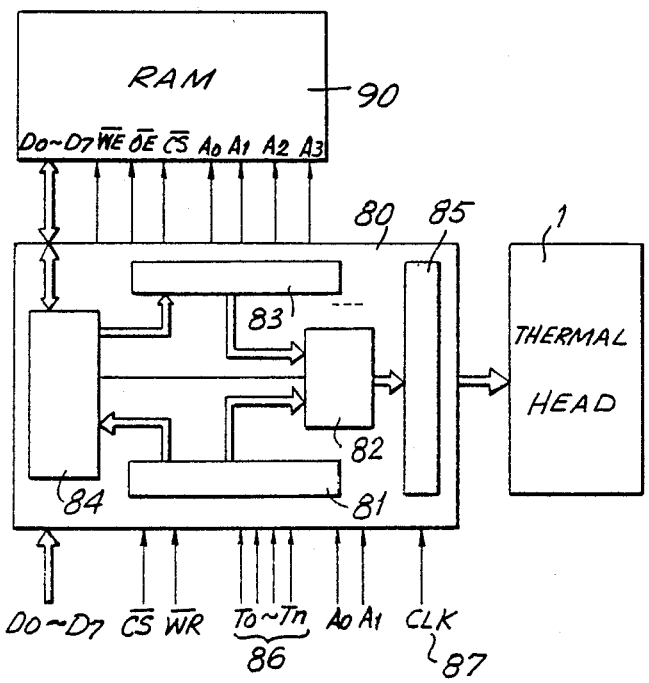
FIG. 6 is a schematic view of a print controlling apparatus in accordance with a second embodiment of the invention.

Reference is next made to FIG. 6 wherein a schematic depiction of a print controlling apparatus in accordance with the second embodiment of the invention utilizing a special purpose RAM, utilized as a memory circuit member is depicted. A head control member 80 is included in the heat generating control circuit for the thermal head. A RAM memory circuit 90 is coupled to head control member 80. Eight data lines D0–D7 for address lines $A_0$–$A_3$, a $\overline{WE}$ signal an $\overline{OE}$ signal and a $\overline{CS}$ signal also connect RAM 90 and head control member 80. Head control member 80 includes a data latch circuit 81 for recording the next new data, a data control member 84 for controlling the movement of data within RAM 90. A data latch circuit 83 stores any preceding data for comparison with the present data stored in data latch 81. The data when needed is read out from RAM 90 through data control member 84 and then into data latch circuit 83. Gate circuit member 82 performs the logic control to provide an appropriate energizing data signal depending upon the comparison between the present driving data and the preceding data performed by head driving circuit member 82. Data control member 84 reads out the needed preceding data from RAM 90 and temporarily stores it in data latch circuit 83 as appropriate based on a predetermined control process during the power supply periods.

It is possible to increase the number of pulses T0 up to TN of energizing interval signal 86 in accordance with the preceding memory counts. The energizing interval signal 86 is different from that applied to HCU 3 primarily because head control member 80 requires a clock input terminal CLK 87 for sequencing operation of head control member 84 and for producing control signals for accessing RAM 90.

Since head control member 84 is sequentially operated it does not need a complex control member such as a CPU and a logic circuit constructed with TLL logic or the like is adequate to control head control member 84. In these embodiments, the CPU is utilized as a processer for controlling printing, but printing may instead be under the control of a DMA controller or the like.

Figure 7:
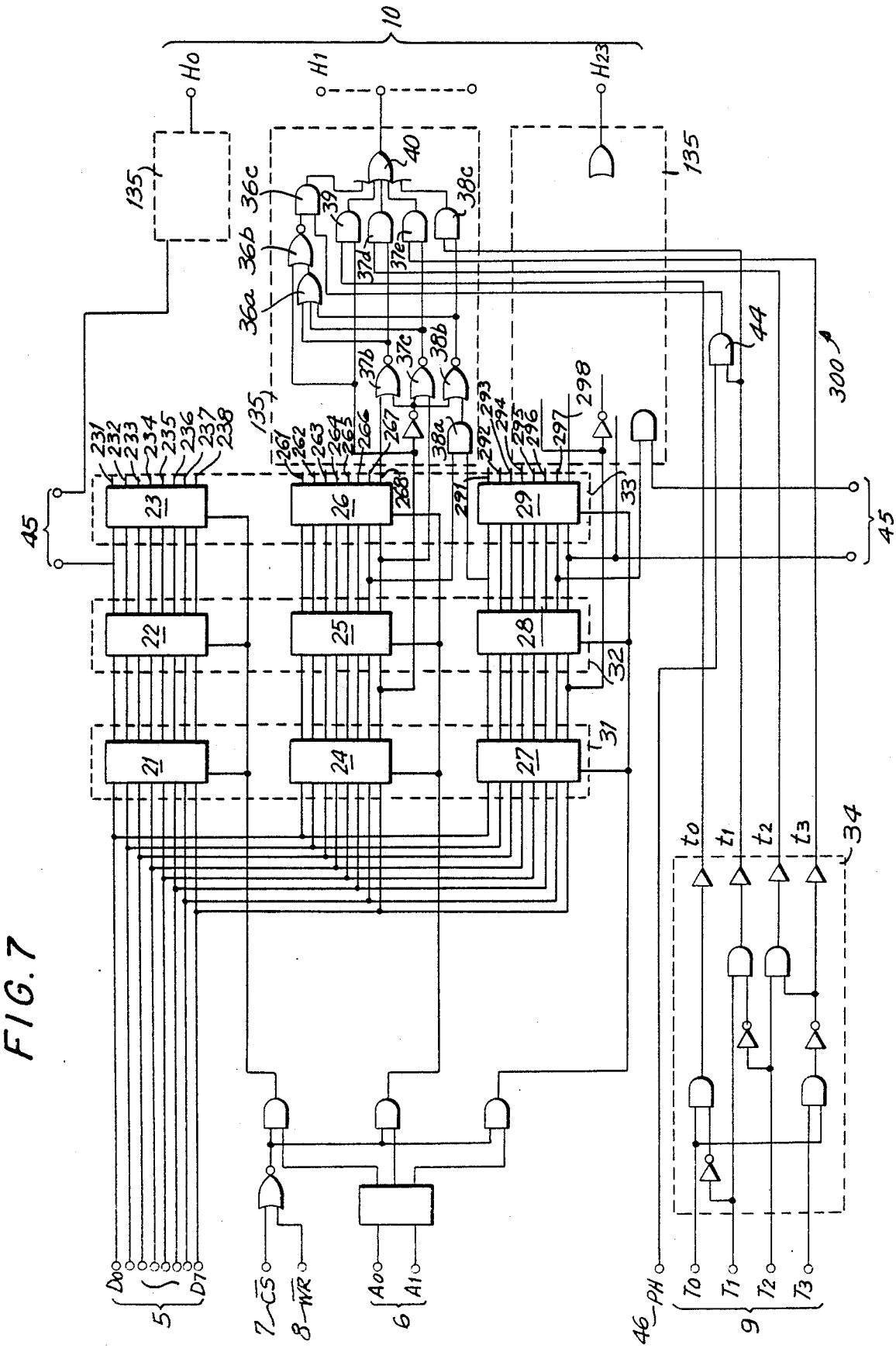
FIG. 7 is a block diagram of a head control circuit unit used for a thermal print head in accordance with another embodiment of the invention.

Reference is next made to FIG. 7 wherein a head control circuit unit 300 constructed in accordance with a second embodiment of the invention is depicted. Like elements are represented by like reference numerals. HCU 300 is similar in many ways to HCU 3 of FIG. 2.

Unlike HCU 3 of FIG. 2, HCU 300 of FIG. 7 includes only one type of gate circuit 135. The end dots $H_0$ and $H_{23}$ include the same logic gating elements as do the middle dots $H_1$–$H_{22}$, utilizing expansion terminals 45 for connecting the data for the dots at the end of the thermal head.

HCU 300 includes logic for preheating the heat generating elements in addition to reducing the energizing interval Control logic gate 135 includes gates 37a, 37b, 37c, 37d and 37e to eliminate predetermined energizing times from the total energizing interval, when the present print data is "ON", i.e. directs printing of a dot, as does prior data history for the designated heat generating element. Gates 38a, 38b and 38c eliminate a predetermined energizing time from the total energizing time, when the current data is "ON" and the immediately previous print data of adjacent heat generation elements indicates the ability to eliminate this predetermined energizing time. Further, gates 36a, 36b and 36c act to preheat heat generating elements but not print dots as a result of the preheating when the present print data is "OFF". OR gate 40 determines the total time for supplying energy to the heat generating element by integrating the several energizing intervals depending upon the present and past print data.

An AND gate 44 detects whether the heat generating element is preheated by a signal applied through preheat control terminal PH 46 and time interval signal t1, because the printing properties are different depending upon whether thermal paper or a thermal transfer ink ribbon is utilized in the printer.

As a result of this examination, when thermal paper is utilized, marking of the paper is likely to occur, if there is preheating, in accordance with the gray-scale response of the thermal paper to heat. Therefore, it is not necessary to preheat the thermal paper. On the other hand, when a thermal transfer ink ribbon is utilized, it is necessary to preheat the ink ribbon to provide consistent reproducable print density.

Expansion terminal 45 allows HCU 3 to exchange memory data across the ends of the terminal head and is particularly useful where the heat generating element includes 32 or 48 dots.

The energizing pulse applied to control the preheating condition is an interval of t1. Other intervals or a special interval may be used instead.

Reference is next made to FIG. 8 wherein the method of applying thermal energy to the thermal head in accordance with the second embodiment of the print controlling device is depicted. Block 151 represents the current print data, block 152 represents the immediately previous print data and block 153 represents the twice previous print data. A "1" indicates an "ON" or printing state while a "0" indicates an "OFF" or no dot state. Waveforms 154, 155, 156, 157, 158 represent the first three pulses of the output waveform of terminals $H_0$, $H_2$, $H_5$, $H_7$ and $H_{10}$, respectively. Block 153 in addition to being the second previous print data is also the initial print data (i.e. there is no previous print data prior to block 153).

When dots of initial data are "ON" energy is applied to the heat generating elements corresponding to the respective dots during an entire energizing interval including the time period $t0+t1+t2+t3$. When dots of initial data are in the "OFF" state, energy is applied to the heat generating element only during interval t1 to preheat the heat generating element. An energizing interval for preheating the heat generating element is determined in a range that is suitable to elevate the temperature of the substrate of the thermal head but is not long enough to change the color of the thermal paper or to form dots resulting from the melting of ink on the ink ribbon. In this embodiment, the energizing interval which is eliminated dependent upon the data history of the adjacent heat generating elements is the same interval as is used for preheating the heat generation elements. However, the energizing interval for preheating the heat generating element is not limited to this period and other intervals including a separate interval may be utilized.

Japanese Patent Laid-Open Application No. 61-158476 discloses that a preheat pulse is applied to the heat generating element only when the next data is "ON". However, in accordance with applicant's invention, when the heat generating element is not preheated for a long time, it is not possible to sufficiently preheat the heat generating element with only a single preheat pulse. The entire substrate of the thermal head may have become too cool to produce even density printing. To eliminate this problem, even when the print data does not indicate the printing of a dot, the heat generating element corresponding to the data is preheated synchronous with the energizing signal, thereby making it possible to keep the heat generating elements in the thermal head at a substantially uniform temperature and prevent uneven heat density.

In addition, in accordance with the present invention, prior to the beginning of printing, several tens of preheat pulses are applied to all of the heat generating elements to elevate the temperature of the substrate of the thermal head so that the print density at the right and left ends of the line completely conform. I this approach, printing may be carried out by adding a line of "0" so that the first line of print data merely preheats the thermal head. The printing may be carried out by changing the data history to "0" indicative of the "OFF" state and transmitting the data at the same time as the printing timing.

The energizing waveforms of FIG. 8 are now described in greater detail. When the current print data and the immediately previous print data at a designated dot call for printing of print data, the energizing interval is reduced by predetermined interval t3 as shown in the hatched lines in the second pulse of waveform 154. When the present print data is "ON", the immediately previous print data is "OFF", but the twice previous print data is "ON" the length of the energizing time is reduced by predetermined interval t2 as shown in the hatched lines in the third pulse of waveform 157. When the present print data, immediately previous print data and twice previous print data are all "ON", the energizing time is reduced by predetermined intervals t3 and t2, as shown in the third pulse of waveform 154. When the immediately previous print data for both adjacent dots are "ON", predetermined interval t1 is eliminated from the energizing pulse, as shown by the third pulse of waveform 156. When each of the various intervals which can be eliminated from a drive pulse when a dot is to be printed are eliminated, a drive pulse equal to interval t0 (as shown by the third pulse in waveform 158), is provided.

On the other hand, when the present print data is "OFF", a preheat pulse of length t1 is supplied to the generating element. However, when it is detected that the heat generating element is sufficiently heated, no further preheat pulse is supplied. Experimentally it has been determined that when either the immediately previous print data or both of the immediately previous adjacent print data are "ON" no preheating pulse is applied. This situation is highlighted by the absence of the expected second pulse in waveform 155. On the other hand, when the energizing pulses for the present data is applied responsive to the twice previous print data only, the preheat pulse is supplied. The above preheating system is particularly advantageous and logic gate circuit 135 has been constructed to implement the above system.

As described with respect to the embodiment of FIG. 2, the pulse interval herein is determined by combinations of the preceding print data history. In this system, there are eight possibilities, and four energizing interval signals are applied to the heat generating element to separately treat each of the eight states.

Reference is next made to FIGS. 9A and 9B wherein a print head 180 constructed in accordance with one embodiment of a thermal serial printer in accordance with the invention is depicted. A glass glaze 182 covers and projects above a portion of a ceramic substrate 181. Heat generating elements 183 are located within projecting portion of glaze 182. A flexible cable 184 is connected to the thermal head at electrodes 187. A thermistor 185 is located on the rear side of substrate 181. A resin 186 covers thermistor 185. A further heat generating substrate may be commonly disposed on resin 186 at the rear side.

Reference is next made to FIGS. 10A and 10B which show the relation between the temperature of the heat generating elements $T_n$ and glass glaze 182 and time, respectively. FIG. 10A shows one comparative example where no preheat pulses are applied either prior to printing or during printing. FIG. 10B shows an embodiment of the invention wherein preheat pulses are applied prior to the start of printing. In FIG. 10A, drive pulses 191 are shown. In FIG. 10B, pulses 192 and 194 are preheat pulses while pulses 193 are drive pulses. Dotted lines 195 and 196 shows the temperature of the glass glaze.

In the comparative example of FIG. 10A, the temperature of the glass glaze rises immediately after printing begins. The glass glaze during printing is then kept at substantially the predetermined temperature due to the charging and discharging of heat. However, as soon as printing is discontinued, the temperature of the glass glaze quickly drops, as shown by the portion of dotted line 195 beyond the end of drive pulses 191.

On the contrary, in a print controlling apparatus in accordance with the present invention, the temperature of the glass glaze goes up to the desired range as a result of preheat pulses 192. Accordingly, when drive pulses 193 commence, the thermal head is already at the preferred temperature so that high quality and consistent print density is always obtained. Thereafter, when driving pulses 193 cease, preheat pulses 194 are continuously applied, regardless of the absence of dots to be printed. As a result, the glass glaze remains at the predetermined temperature so that when printing is again commenced in the future, the printing is not inferior in printing density to the prior printing and consistent printing at the predetermined density is achieved.

In accordance with the above describe embodiment, the thermal head is kept at a substantially uniform temperature by applying preheat pulses both before and during the print cycle so that the thermal head is always maintained at its peak printing condition. In addition, the present invention has the advantage of improving printing quality while controlling peak temperature and thereby extending the life of the thermal head which can be damaged due to application of excessive energy to the heat generating elements.

Figure 11:
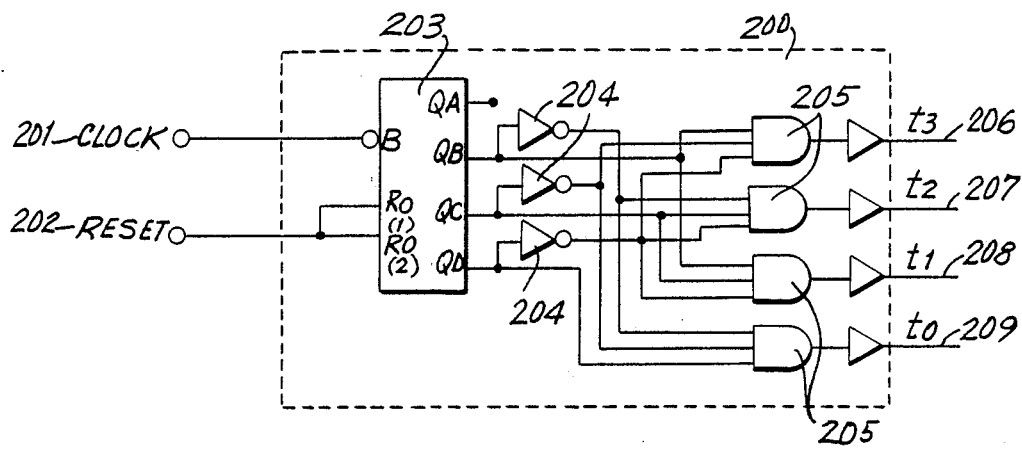
FIG. 11 is a schematic view of a pulse generating circuit for a print controlling apparatus in accordance with a second embodiment of the invention.

Reference is next made to FIG. 11 wherein an energizing interval signal generating circuit 200 constructed in accordance with the second embodiment of the print controlling apparatus of the present invention is depicted. Signal generating circuit 200 includes a binary counter 203, invertors 204 and AND gates 205. A CLOCK input 201 and a RESET input 202 are generated by the CPU and control the production of timing signals. Signal generating circuit 200 converts the CLOCK and RESET input signals into pulse intervals t3, t2, t1 and t0 used to rive the heat generating elements of the thermal head.

Figure 12:
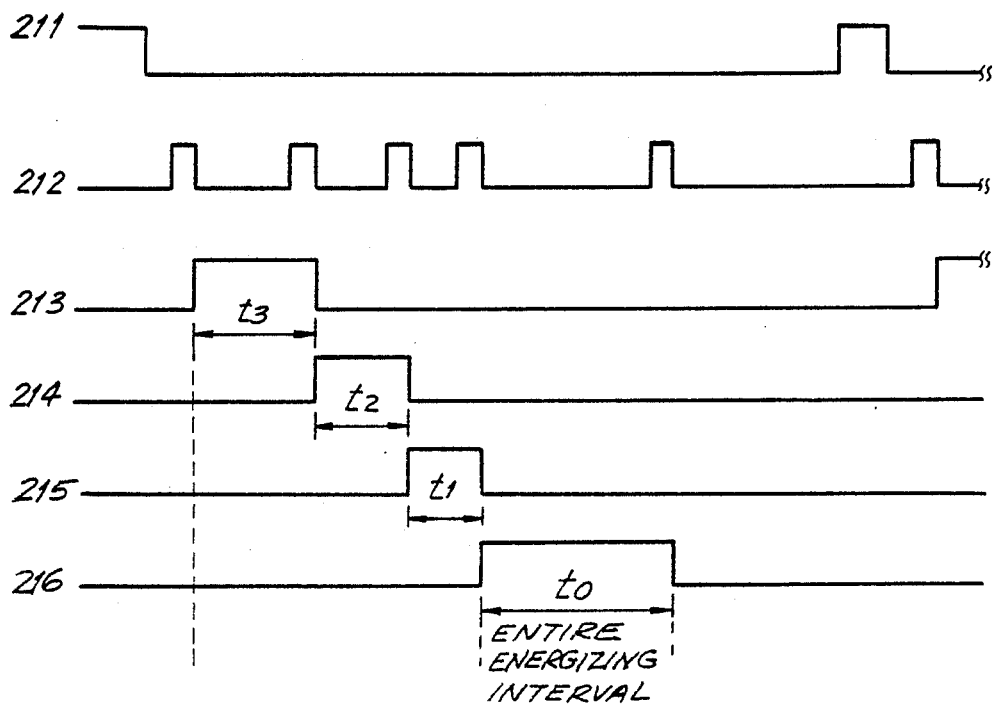
FIG. 12 is a graphical representation of the energizing pulses and energizing interval signals in the pulse generating circuit of FIG. 11.

Reference is made to FIG. 12 wherein the input and output waveforms of signal generating circuit 200 are depicted. Waveform 211 shows the reset input waveform and waveform 212 is the clock input waveform. The cycle of the clock input signal is sequentially variable and is established by the CPU. By input of the RESET signal and the CLOCK signal, binary counter 203 outputs four bit codes QA, QB, QC, Q. Invertors 204 and AND gates 205 convert these bit codes into waveforms 213, 214, 215 and 216. The output waveforms o terminals 206, 207, 208 and 209 are shown as waveforms 213, 214, 215, 216, respectively and are pulse intervals t3, t2, t1 and t0, respectively. Further, if signals for designating a heat applying interval such as t3, t2, t1 an t0 having different pulse widths are required, such signals can be obtained by generating clock pulses at different intervals on a single line as shown by clock input wave form 212 and controlling the gates, for instance, with reset input signal 211. Namely, interval signals of different widths, t3, t2, t1, t0 can be generated with a small number of lines. It is very effective to form a driving circuit in this way. Therefore, controls for heat generation and driving in accordance with the past data history is made easier by generating signal 212 forming t3 to t0 and signals 213 to 216 forming t3, t2, t1 and t0. Each pulse interval represents one of the energizing periods for the heat generating elements. The pulse signals are then selectively applied to the heat generating elements depending upon the memory data, as described above. Accordingly, input terminal 9 and the components included therein, shown in FIG. 2, may be eliminated.

Thus, in accordance with the present invention it is not necessary to process data representative of the print data history in the CPU and it is possible to allow the CPU to process information at high speed, thereby increasing the printing speed of the thermal printer.

In addition, a heat generating control circuit unit for the print head can be formed as a single chip by a gate array, one of the ASIC, or the like, and can be arranged above the memory map of the CPU and thus record data directly from the CPU, thereby enabling the complicated processing of head drive data with a simple construction. Further, it is possible to move all the data simultaneously with input of data so that high speed printing is enabled.

In addition, preheat pulses can be applied to the heat generating elements in response to the print data history so that even where there are spaces where no dots are printed during the printing operation, uniform density printing is achieved without a reduction in the printing density.

Accordingly, a print controlling apparatus for a thermal printer which will selectively drive the heat generating elements of the thermal head based on the past print data history without the need for direct CPU involvement in the driving operation and selective preheating of the heat generating elements is provided.

It will thus be seen that the objects set forth above, among those made apparent from the preceding description, are efficiently attained nd, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

WHAT IS CLAIMED IS:

1. A print controlling apparatus for a thermal printer adapted to print, with a thermal head having a plurality of heat generating elements, on thermal paper or on nonthermal paper through a thermal ink ribbon and including a processor having a data bus line and an address bus line, the address bus line carrying an address signal designation for processing data to be printed and outputting the data, the print controlling apparatus comprising:

head control circuit means coupled between the processor and thermal head for converting the data to be printed output from the processor to energizing signals for selectively heating the heat generating elements, the head control circuit means including:

timing means for providing at least three predetermined energizing intervals;

storage means for storing present print data and at least two previous print data;

gating means coupled to the timing means and storage means for producing energizing signals for each of the heat generating elements by logically combining the predetermined energizing intervals and the present print data and the previous print data; and said head control circuit means being coupled with the data bus line and address bus line of said processor, the storage means including a plurality of latch circuits, said head control means being activated by the address signal designation carried along said address bus line for latching the print data disposed in said data bus line to allow the print data to be written into said head control circuit means which is selected in accordance with predetermined address information.

2. The print controlling apparatus of claim 1 wherein the storage means stored present print data, immediately previous print data and twice previous print data.

3. The print controlling apparatus of claim 2 wherein the storage means includes data latch circuits for storing the present print data, immediately previous print data and twice previous print data and the data latch circuits are coupled 4. The print controlling apparatus of claim 1 further including a data bus, the head control circuit means including a plurality of data input terminals connected to the processor by the bus, the data bus carrying the data to be printed from the processor to the head control circuit means.

5. The print controlling apparatus of claim 1 wherein the head control circuit means includes at least one address input terminal coupled to the processor for receiving address information for selecting a portion of the storage means corresponding to print data which will be used to energize a portion of the heat generating element.

6. The print controlling apparatus of claim 1 wherein the head control circuit means further includes a data strobe input terminal coupled to the processor for signalling the transfer of print data from the processor to the head control circuit means.

7. The print controlling apparatus of claim 6 wherein the present print data is shifted to a storage location for saving the previous print data synchronous with the strobe signal.

8. The print controlling apparatus of claim 1 further comprising pulse generating circuit means for generating timing pulses of at least two pulse widths and outputting the timing pulses to the timing means.

9. The print controlling apparatus of claim 1 further comprising temperature detecting means coupled to the timing means, the temperature detecting means causing the timing means to provide varying energizing intervals.

10. The print controlling apparatus of claim 9 wherein the temperature detecting means causes the varying energizing intervals to change in accordance with detected temperature changes.

11. The print controlling apparatus of claim 1 wherein the gating means eliminates predetermined energizing intervals from a total energizing period based on the previous printing data.

12. The print controlling apparatus of claim 11 wherein the gating means removes a first energizing interval from an energizing signal when the present print data and immediately previous print data both signal the printing of a dot.

13. The print controlling apparatus of claim 12 wherein the gating means eliminates a second energizing interval from the energizing signal when the present print data, immediately previous print data and twice previous print data all signal the printing of a dot.

14. The print controlling apparatus of claim 12 wherein the gating means eliminates a third interval when the present print data and the immediately previous print data from at least one adjacent heat generating element signals the printing of a dot.

15. The print controlling apparatus of claim 11 wherein the gating means eliminates a second energizing interval from the energizing signal when the present print data, immediately previous print data and twice previous print data all signal the printing of a dot.

16. The print controlling apparatus of claim 15 wherein the gating means eliminates a third interval when the present print data and the immediately previous print data form both adjacent heat generating element signal the printing of a dot.

17. The print controlling apparatus of claim 11 wherein the gating means eliminates a third interval when the present print data and the immediately previous print data from an adjacent heat generating element signals the printing of a dot.

18. The print controlling apparatus of claim 11 wherein the gating means provides an energizing signal having at least a fourth interval when the present print data signals the printing of a dot.

19. The print controlling apparatus of claim 1 wherein the gating means further produces preheat signals for maintaining the thermal head at a desired temperature.

20. A print controlling apparatus for a thermal printer with a thermal head having a plurality of heat generating elements and a processor having a data bus line and an address bus line, the address bus line carrying an address signal designation for controlling the thermal printer, the print controlling apparatus comprising:
   storage means for storing present print data and at least one previous print data;
   gating means coupled to the storage means for outputting an energizing time for each heat generating element, the gate means dividing the output energizing time into a main energizing interval corresponding to present driving data and at least two auxiliary energizing intervals corresponding to previous print data;
   energizing interval signal generating means coupled to the gating means for demodulating a frequency based clock signal, and apply the demodulated signal to the gating means as an energizing interval signal; and
   said storage means being coupled to said data bus line and said address bus line, said storage means being activated by the address designation signal carried along said address bus line for storing the present print data disposed in said data bus line to allow the print data to be written into said storage means which is selected in accordance with predetermined address information.

21. A print controlling apparatus for a thermal printer with a thermal head having a plurality of heat generating elements, the print controlling apparatus comprising:
   storage means for storing at least immediately previous print data and twice previous print data;
   energizing width controlling means for establishing a whole energizing time corresponding to at least two energizing time intervals;
   first control means for removing a time interval when the present print data signals the printing of a dot by a heat generating element and the storage means includes previous print data for printing a dot by the heat energizing element;
   second control means for reducing whole energizing time by a second interval when the present print data signals the printing of a dot by the heat generating element and there is data for adjacent heat generating elements for the storage means for printing a dot by adjacent heat generating elements; and
   third control means for adding a predetermined time to the energizing time for the heat generating element when the present print data for the heat generating element signals the printing of no dot and at least one of the first and second control means do not reduce the energizing time.

22. The print controlling apparatus of claim 21 wherein the energizing width control means includes a heat sensitive element for detecting the temperature of at least one of the thermal head and an ambient temperature, the whole energizing time being varied based on the sensed temperature.

23. A method of maintaining a thermal head, with a plurality of heat generating elements, in a thermal printer at about a desired temperature, comprising:
   receiving print data for a heat generating element for printing a dot or not printing a dot;
   determining whether the print data for a heat generating element is to not print a dot;
   checking to see if the immediately previous print data for the heat generating element is to print a dot;
   checking to see if the immediately previous print data for at least one of the heat generating elements adjacent to said heat generating element is to print a dot; and
   generating a preheating pulse at heat during printing to the heat generating element when the present print data for a heat generating element is not to print a dot and neither of the immediately previous print data for the heat generating element and the immediately previous print data for the to adjacent heat generating elements are to print a dot.

24. The method of claim 23 further comprising generating a preheating pulse prior to initiation of printing.

* * * * *